United States Patent
Engstrom et al.

(10) Patent No.: US 7,431,889 B2
(45) Date of Patent: Oct. 7, 2008

(54) INNER WALLS OF MICROFLUIDIC DEVICES

(75) Inventors: Johan Engstrom, Uppsala (SE); Cecillia Hellermark, Lidingo (SE)

(73) Assignee: Gyros Patent AB, Uppsala (SE)

( * ) Notice: Subject to any disclaimer, the term of this patent is extended or adjusted under 35 U.S.C. 154(b) by 16 days.

(21) Appl. No.: 11/193,953

(22) Filed: Jul. 29, 2005

(65) Prior Publication Data

US 2006/0110294 A1      May 25, 2006

Related U.S. Application Data

(63) Continuation of application No. PCT/SE2004/000109, filed on Jan. 28, 2004.
(60) Provisional application No. 60/444,212, filed on Jan. 30, 2003.

(30) Foreign Application Priority Data

Jan. 30, 2003    (SE)    .................................... 0300225

(51) Int. Cl.
*B01L 3/02*    (2006.01)
*B32B 5/02*    (2006.01)
*B32B 27/04*    (2006.01)
*B32B 27/12*    (2006.01)
*G01N 15/06*    (2006.01)

(52) U.S. Cl. ........................ 422/100; 422/50; 422/68.1; 422/81; 422/82; 436/43; 436/63; 436/52; 436/53; 436/174; 436/180

(58) Field of Classification Search ................... 422/50, 422/68.1, 100, 81, 82; 436/43, 63, 52, 53, 436/174, 180

See application file for complete search history.

(56) References Cited

U.S. PATENT DOCUMENTS

| 6,176,962 | B1 | 1/2001 | Soane et al. |
| 6,322,682 | B1 | 11/2001 | Arvidsson et al. |
| 6,326,083 | B1 | 12/2001 | Yang et al. |

(Continued)

FOREIGN PATENT DOCUMENTS

DE    197 53 847.9    12/1997

(Continued)

OTHER PUBLICATIONS

Cohen et al., "Surface modification of inorganic oxide surfaces by graft polymerization," in: *Oxide Surfaces*, Wingrave, Marcel Dekker, Inc. (ed.), New York, pp. 321-343, 2001.

(Continued)

*Primary Examiner*—Brian J Sines
(74) *Attorney, Agent, or Firm*—Fulbright & Jaworski, LLP

(57) ABSTRACT

A microfluidic device comprising one, two, three or more enclosed microchannel structures, each of which comprises a) an inlet arrangement with an inlet opening for liquid, b) a reaction microcavity ($RM_1$) downstream to the inlet opening, and c) an upstream section that is located between the inlet opening and the reaction microcavity ($RM_1$) and is defined between two planar substrates made of plastic material which substrates are common for said microchannel structures. The characteristic feature is that the inner wall in said upstream section exposes a hydrophilic surface area with an underlying base layer comprising metal oxide. In one aspect the microfluidic device as such is covered.

13 Claims, 4 Drawing Sheets

U.S. PATENT DOCUMENTS

| | | | |
|---|---|---|---|
| 6,632,656 B1 | 10/2003 | Thomas et al. |
| 6,653,625 B2 | 11/2003 | Andersson |
| 6,812,457 B2 | 1/2004 | Andersson |
| 6,717,136 B2 | 4/2004 | Andersson |
| 6,812,456 B2 | 11/2004 | Andersson |
| 6,852,851 B1 | 2/2005 | Tooke et al. |
| 6,884,395 B2 | 4/2005 | Tooke et al. |
| 6,919,058 B2 | 7/2005 | Andersson et al. |
| 6,955,738 B2 | 10/2005 | Derand et al. |
| 6,967,101 B1 | 11/2005 | Larsson et al. |
| 2002/0123134 A1 | 9/2002 | Huang et al. |
| 2002/0125135 A1 | 9/2002 | Derand et al. |
| 2003/0029724 A1 | 2/2003 | Derand et al. |
| 2003/0053934 A1 | 3/2003 | Andersson et al. |
| 2003/0054563 A1 | 3/2003 | Ljungstrom et al. |
| 2003/0129360 A1 | 7/2003 | Derand et al. |
| 2003/0143114 A1 | 7/2003 | Andersson et al. |
| 2003/0156763 A1 | 8/2003 | Soderman |
| 2003/0173650 A1 | 9/2003 | Larsson et al. |
| 2003/0211012 A1 | 11/2003 | Bergstrom |
| 2004/0058408 A1 | 3/2004 | Thomas et al. |
| 2004/0067051 A1 | 4/2004 | Kylberg et al. |
| 2004/0096867 A1 | 5/2004 | Andersson |
| 2004/0099310 A1 | 5/2004 | Andersson |
| 2004/0120856 A1 | 6/2004 | Andersson |
| 2004/0131345 A1 | 7/2004 | Kylberg et al. |
| 2004/0202579 A1 | 10/2004 | Larsson et al. |
| 2005/0019819 A1 | 1/2005 | Tooke et al. |
| 2005/0042770 A1 | 2/2005 | Derand et al. |
| 2005/0141344 A1 | 6/2005 | Ekstrand et al. |
| 2005/0153431 A1 | 7/2005 | Andersson et al. |
| 2005/0153432 A1 | 7/2005 | Andersson et al. |
| 2005/0153433 A1 | 7/2005 | Andersson et al. |
| 2005/0153434 A1 | 7/2005 | Andersson et al. |
| 2005/0179901 A1 | 8/2005 | Kange et al. |
| 2005/0186685 A1 | 8/2005 | Kange et al. |
| 2005/0202471 A1 | 9/2005 | Tooke et al. |
| 2005/0214442 A1 | 9/2005 | Larsson et al. |

FOREIGN PATENT DOCUMENTS

| | | |
|---|---|---|
| WO | WO-91/16966 | 11/1991 |
| WO | WO-94/29400 | 12/1994 |
| WO | WO-97/21090 | 6/1997 |
| WO | WO-98/07019 | 2/1998 |
| WO | WO-98/45693 | 10/1998 |
| WO | WO-98/53311 | 11/1998 |
| WO | WO-99/29429 | 6/1999 |
| WO | WO-99/55827 | 11/1999 |
| WO | WO-99/56954 | 11/1999 |
| WO | WO-99/58245 | 11/1999 |
| WO | WO-00/04390 | 1/2000 |
| WO | WO-00/21728 | 4/2000 |
| WO | WO-00/25921 | 5/2000 |
| WO | WO-00/40750 | 7/2000 |
| WO | WO-00/56808 | 9/2000 |
| WO | WO-00/62042 | 10/2000 |
| WO | WO-00/69560 | 11/2000 |
| WO | WO-00/78455 | 12/2000 |
| WO | WO-00/79285 | 12/2000 |
| WO | WO-01/02737 | 1/2001 |
| WO | WO-01/14116 | 3/2001 |
| WO | WO-01/19586 | 3/2001 |
| WO | WO-01/30500 | 5/2001 |
| WO | WO-01/47637 | 7/2001 |
| WO | WO-01/54810 | 8/2001 |
| WO | WO-01/87486 | 11/2001 |
| WO | WO-01/87487 | 11/2001 |
| WO | WO-02/074438 | 9/2002 |
| WO | WO-02/075312 | 9/2002 |
| WO | WO-02/075775 | 9/2002 |
| WO | WO-02/075776 | 9/2002 |
| WO | WO-03/018198 | 3/2003 |
| WO | WO-03/024598 | 3/2003 |
| WO | WO-03/055790 | 7/2003 |
| WO | WO-03/086960 | 10/2003 |
| WO | WO-03/093802 | 11/2003 |
| WO | WO-2004/050247 | 6/2004 |
| WO | WO-2004/067444 | 8/2004 |
| WO | WO-2004/083108 | 9/2004 |
| WO | WO-2004/083109 | 9/2004 |

OTHER PUBLICATIONS

Cui et al., "Indium tin oxide alternatives—high work function transparent conducting oxides as anodes for organic light-emitting diodes," *Adv. Mater.*, 13(19): 1476-1480, 2001.

Doron et al., "Organization of Au colloids as monolayers films onto ITO glass surfaces: Application of the metal gold colloid films as base interfaces to construct redox-active monolayers," *Langmuir*, 11: 1313-1317, 1995.

Ederth, "Electrical Transport in Nanoparticle Thin Films of Gold and Indium Tin Oxide," Comprehensive Summaries of Uppsala Dissertations from the Faculty of Science and Technology, Uppsala, 2003.

Fang et al., "Soft-lithography-mediated submicrometer patterning of self-assembled monolayer of hemoglobin on ITO surfaces," *Langmuir*, 16: 5221-5226, 2000.

Fang et al., "Anchoring of self-assembled hemoglobin molecules on bare indium-tim oxide surfaces," *Langmuir*, 17: 4360-4366, 2001.

Hofer et al., "Alkyl phosphate monolayers. Self-assembled from aqueous solution into metal oxide surfaces," *Langmuir*, 17: 4014-4020, 2001.

Huang et al., "Biotin-Derivatized Poly(L-lysine)-g-poly(ethylene glycol): A Novel Polymeric Interface for Bioaffinity Sensing," *Langmuir*, 18: 220-230, 2002.

Huang et al., "Poly(L-lysine)-g-poly(ethylene glycol) Layers on Metal Oxide Surfaces: Surface-Analytical Characterization and Resistance to Serum and Fibrinogen Adsorption," *Langmuir*, 17: 489-498, 2001.

International Preliminary Report on Patentability for PCT/SE2004/000109.

International Search Report for PCT/SE2004/000109.

Kenausis et al., "Poly(L-lysine)-g-Poly(ethylene glycol) Layers on Metal Oxide Surfaces: Attachment Mechanism and Effects of Polymer Architecture on Resistance to Protein Adsorption," *J. Phys. Chem. B*, 104: 3298-3309, 2000.

Markovich et al., "Preparation and characterization of octadecylsilane monolayers on indium-tin oxide (ITO) surfaces," *J. Electroanalytical Chemistry*, 500: 453-460, 2001.

Oh et al., "Formation of a self-assembled monolayer of diaminododecane and a heteropolyacid monolayer on the ITO-surface," *Langmuir*, 15: 4690-4692, 1999.

Oh et al., "Ionic charge-selective electron transfer at fullerene-multilayered architecture on an indium-tin oxide surface," *Langmuir*, 16:6777-6779, 2000.

Schwendel et al., "Temperature dependence of the protein resistance of poly- and oligo(ethylene glycol) terminated alkanethiolate monolayers," *Langmuir*, 17: 5717-5720, 2001.

Textor et al., "Structural chemistry of self-assembled monolayers of octadecylphosphoric acid on tantalum oxide surfaces," *Langmuir*, 16: 3257-3271, 2000.

Yamamoto et al., "Cell-Free Protein Synthesis in PDMS-Glass Hybrid Microreactor," in: *Microfluidic Devices and Systems III*, Mastrangelo et al. (eds), Proceedings of SPIE 4177: 72-79, 2000.

Yan et al., "Preparation and characterization of self-assembled monolayers on indium tin oxide," *Langmuir*, 16: 6208-6215, 2000.

Zotti et al., "Self-assembly of pyrrolyl- and cyclopentadiyldithiophene-4-yl-n-hexyl-ferrocene on ITO electrodes and their anodic coupling to polyconjugated polymer layers," *Langmuir*, 13: 2694-2698, 1997.

Ahn et al., "Surface Modification Of Cyclic Olefinic Copolymers For Bio-Mems Microfluidic Devices", Biomems and Bionanotechnology, Symposium (Materials Research Society, Proceeding, vol. 729), 2002, 131-136.

European Communication issued Jan. 23, 2008 during the prosecution of European Patent Application NO. 04 705 970.4 - 2203.

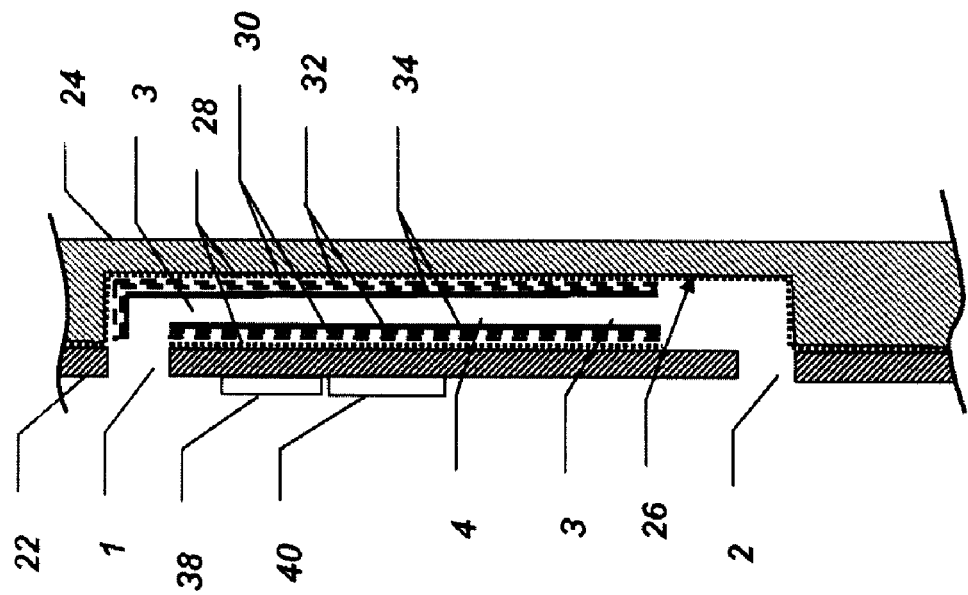
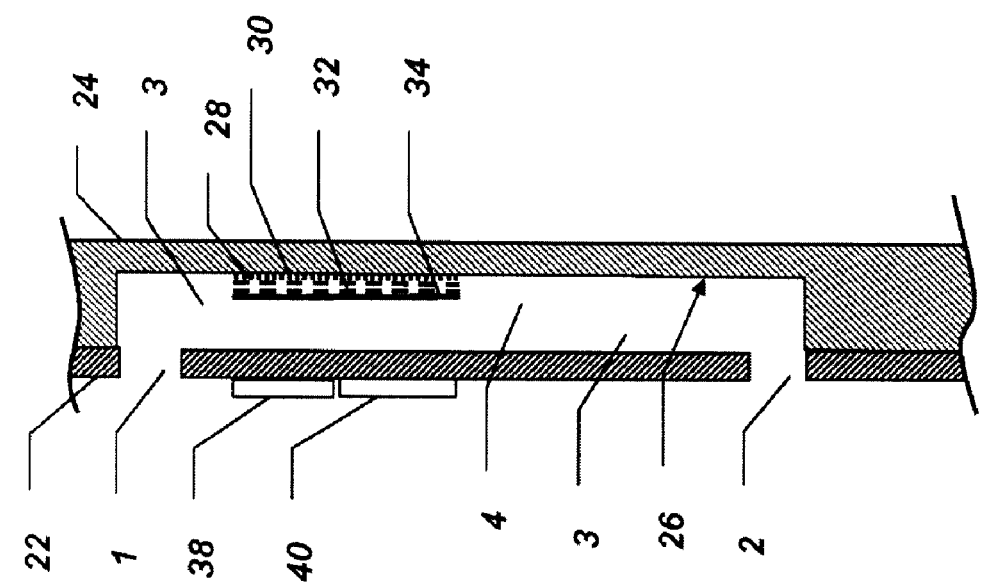

INNER WALLS OF MICROFLUIDIC DEVICES

CROSS-REFERENCE TO RELATED APPLICATIONS

This application is a continuation of International Application No. PCT/SE2004/000109 filed Jan. 28, 2004 which claims priority to Swedish Application No. 0300225-0 filed Jan. 30, 2003 and U.S. Provisional Application No. 60/444,212 filed Jan. 30, 2003.

TECHNICAL FIELD

The present invention relates to microfluidic devices that have novel designs of coatings on inner walls, and methods for introducing these coatings.

A microfluidic device comprises one, two, three or more enclosed microchannel structures. Each microchannel structure typically comprises a) an inlet arrangement with an inlet opening to ambient atmosphere, b) a reaction microchamber downstream to the inlet opening, and c) an outlet opening. In a typical variant the microchannel structures are defined between the surfaces of two or more planar substrates that are pair wise apposed and parallel. If different sections of a microchannel structure are defined between different pairs of planar substrates, there typically are holes in the substrates so that these sections are in communication with each other.

The term "microfluidic" means that reactants, analytes, washing agents (including liquids as such), reaction products etc are transported between functional units of a microchannel structure in microvolumes of liquid. Reactants may be linked to particles.

The inlet opening is primarily for liquids and the outlet opening for excess of air and possibly also for liquid.

A microfluidic device is typically used for performing a number of experiments in parallel within biological and/or chemical sciences such as medicine, diagnostics, biochemistry, drug development etc. Typically, each experiment comprises one or more dispensation steps for introducing the reagents, samples and other liquids needed, one or more reaction steps, and one or more detection steps. A reagent may be predispensed. In principle each experiment requires one microchannel structure. The experiments are performed for analytical and/or preparative purposes and may include separation of particulates from a liquid or separation of various dissolved or suspended entities from each other. Synthetic protocols may also be included.

Patent publications that are cited in this specification are incorporated by reference in their entirety. For WO publications this in particular means their US designation or corresponding U.S. patent and corresponding U.S. patent application.

BACKGROUND OF THE INVENTION

Background Problems

The invention concerns problems that are associated with
a) obtaining proper transport of reagents, analytes, washing liquid, buffers etc from an inlet opening to a reaction microcavity in parallel in a plurality of microchannel structures of a microfluidic device,
b) obtaining good stability with respect to wettability of plastic material that are to be in contact with a liquid within the microfluidic format (storage stability and stability towards rewetting once, twice etc,
c) obtaining reduced fouling of reagents, e.g. reagents exhibiting peptide structure, carbohydrate structure, lipid structure, nucleotide structure, nucleic acid structure, hormone structure, steroid structure etc,
d) release of residual monomers, initiators, softeners etc from plastic material,
e) changes of chemical surface characteristics caused by molecular movements and conformational changes in plastics during storage,
f) providing cost effective surface treatment methods that can be used in the large scale manufacturing of microfluidic devices, and
g) provide surfaces that are to be included as inner surfaces in microfluidic devices and which are good substrates for further patterning, attachment of reagents and other functionalizations such hydrophobization, introduction of ionic groups etc.

The miniaturization of the protocols that nowadays are performed in microfluidic systems started during the late eighties. The substrate material of choice was silicon or glass, which inherently have a good wettability (hydrophilicity) for aqueous liquids. In most cases there was no imperative need to separately make the surfaces wettable (hydrophilic).

Later, plastic materials and replication techniques were exploited (e.g. WO 9116966 Amersham Pharmacia Biotech AB; WO 0114116 Åmic AB; WO 0119586 Åmic AB; WO 0021728 Åmic AB). However, plastics inherently have poor wettability and are often hydrophobic. Proper hydrophilization protocols became important.

Downscaling as such will decrease the volume-to-surface ratio, which means a significantly increased risk for undesired consumption/inactivation of reactants, for instance by fouling (non-specific adsorption and/or denaturation).

Fouling and storage stability with respect to hydrophilic/hydrophobic balance were truly overlooked in the initial work when miniturizing. However, these issues are extremely important for the large scale commercialization of microfluidic concepts that utilize devices made in plastic material.

Most likely, the optimal coating of inner surfaces of microfluidic devices will depend on the protocol as such, reagents/reactants and/or liquids to be used, analyte to be assayed, substrate material etc.

For the reasons given above, there is a need for a range of proper treatment protocols for surfaces to be used as inner surfaces in contact with aqueous liquids in microfluidic devices made of plastic material.

Background Publications

Many recent publications in microfluidics present surface treatments in general terms without recognizing the actual problems. See for instance WO 9721090 (Gamera Biosciences) and WO 9958245 (Amersham Pharmacia Biotech AB) where both gas plasma treatment and coating with hydrophilic compounds are mentioned in general terms.

Other recent publications suggest solutions to one or more of the problems discussed above:

WO 0056808 (Amersham Pharmacia Biotech AB) describes gas plasma treatment of plastic surfaces in order to achieve hydrophilic surfaces which have improved storage stability and which are able to withstand repeated contact with aqueous liquid media.

WO 0147637 (Gyros AB) describes coatings for plastic substrates. The coatings expose a non-ionic hydrophilic polymer to a liquid flow and are introduced in order to balance hydrophilicity versus non-specific adsorption. The hydrophilic polymer is typically covalently attached to a base skeleton that in turn binds to a plastic surface. In the case of charged base skeletons, it is suggested to pre-introduce the opposite charges on the naked plastic surface by e.g. gas plasma hydrophilization. Pre-coating of the plastics with a metal layer is also suggested.

U.S. Pat. No. 6,236,083 (Caliper) describe coatings that are resistant towards non-specific adsorption of proteins. The coatings are used for facilitating controlled electro-osmotic flow in the microchannels. Certain variants are similar to those of WO 0147637 (Gyros AB). The supporting substrate is made of an organic polymer, glass or a silica-based polymer.

WO 02075775 (Gyros AB) and WO 0275776 (Gyros AB) describe among others a conductive layer of indium tin oxide in an outlet port for energy desorption ionization mass spectrometry.

WO 0004390 (Zyomyx) presents microfluidic sensor surfaces that have a layered structure comprising an upper organic thin layer resting on a supporting layer. A number of alternative support layers are given, for instance various metal and metal oxide layers including among others indium tin oxide.

The capacity of metal oxide surfaces, such as surfaces of titanium oxide, indium oxide, tin oxide and various mixtures thereof, for forming bonds with functional groups of organic compounds has been utilized for preparing monolayers exposing surfaces of predetermined chemical surface characteristics. The bonds concerned include covalent bonds and non-covalent bonds such as electrostatic interaction. Since metal oxide surfaces often are charged at moderate pH, they often have a pronounced tendency to nonspecifically adsorb compounds that exhibit groups of the opposite charge, such as proteins. The capacity of binding various compounds to this kind of surfaces has been utilized by:

Cohen et al., "Surface modification of inorganic oxide surfaces by graft polymerization" in "Oxide Surfaces", ed. Wingrave, Marcel Dekker Inc, New York (2001) p. 321-343

Doron et al., "Organization of Au colloids as monolayers films onto ITO glass surfaces: Application of the metal gold coiloid films as base interfaces to construct redox-active monolayers", Langmuir 11 (1995) 1313-1317

Fang et al., "Soft-lithography-mediated submicrometer patterning of self-assembled monolayer of hemoglobin on ITO surfaces", Langmuir 16 (2000) 5221-5226

Fang et al., "Anchoring of self-assembled hemoglobin molecules on bare indium-tin oxide surfaces", Langmuir 17 (2001) 4360-4366, Hofer et al., "Alkyl phosphate monolayers. Self-assembled from aqueous solution into metal oxide surfaces", Langmuir 17 2001) 4014-4020

Mandler, "Preparation and characterization of octadecylsilane monolayers on indium-tin oxide (ITO) surfaces", J. Electroanal. Chem. 500 (2001) 453-460

Oh et al., "Formation of a self-assembled monolayer of diaminododecane and a heteropolyacid monolayer on the ITO-surface", Langmuir 15 (1999) 4690-4692

Oh et al., "Ionic charge-selective electron transfer at fullerene-multilayered architecture on an indium-tin oxide surface", Langmuir 16 (2000) 6777-6779

Schwendel et al., "Temperature dependence of the protein resistance of poly- and oligo(ethylene glycol) terminated alkanethiolate monolayers", Langmuir 17 (2001) 5717-5720

Textor et al., "Structural chemistry of self-assembled monolayers of octadecylphosphoric acid on tantalum oxide surfaces", Langmuir Yan et al., "Preparation anf characterization of self-assembled monolayers on indium tin oxide", Langmuir 16 (2000) 6208-6215

Zotti et al., "Self-assembly of pyrrolyl- and cyclopentadiyldithiophene-4-yl-n-hexyl-ferrocene on ITO electrodes and their anodic coupling to polyconjugated polymer layers", Langmuir 13 (1997) 2694-2698

Huang et al., Langmuir 17 (2001) 489-498, Huang et al., Langmuir 18 (2001) 220-230, and Kenausis et al., J. Phys. Chem B 104 (2000) 3298-3309 have described sensor surfaces based on a supporting layer of metal oxide coated with polycationic polylysine grafted with poly (ethylene oxide) possibly functionalized with a biologically active molecule. This concept has been suggested for use in sensors of a particular kind of microfluidic apparatus. See poster by Vörös et al., "Controlled biosensor surfaces". The coating used significantly reduces the nonspecific adsorption of proteins.

Fang et al., supra, have generally suggested that the non-specific adsorption to indium tin oxide surfaces could be used for setting up sensor surfaces, for instance for assays in the biological field.

Yamamoto et al., "Cell-Free Protein Synthesis in PDMS-Glass Hybrid Microreactor in Microfluidic Devices and Systems III, Eds. Mastrangelo et al., Proceedings of SPIE, Vol 4177 (2000) 72-79) have suggested indium tin oxide as heating layer on a glass substrate of a microcavity intended for cell-free protein synthesis.

A capillary device made from plastic material with the inner wall of the capillary channel coated with aluminum oxide is described in AU 21583/99 (Boehringer Mannheim GmbH).

BRIEF SUMMARY OF THE INVENTION

A first object of the invention is to provide an alternative method for the manufacture of a microfluidic device in which the microchannel structures are defined between planar plastic substrates as discussed above and which has hydrophilic inner surfaces that may or may not be permeable for liquid soluble components that may be present in the plastic substrates. This object primarily concerns at least an upstream section of a microchannel structure, i.e. a section that is upstream a reaction microcavity, e.g. in microconduits that are involved in the transportation of liquid and reagents to the reaction microcavity. Subobjects are to provide new microfluidic devices with wettable inner surfaces that are capable of withstanding repeated contact with aqueous liquids and/or long-term storage, and that can be produced by cost effective methods. The surfaces should in most variants have a pronounced reduction in fouling of biomolecules compared to the bare plastic surfaces. Long-term storage means storage for more than 2 weeks such as more than 1, 2, 3 or four months. For certain variants the goal is storage for ten months, twelve months or more.

A second object is to provide a microfluidic device in which the inner walls are transparent and comprise a metal oxide layer in an inlet arrangement, a transport microconduit or any other microconduit in an upstream section.

A third object is to provide alternative microfluidic devices as defined herein in which voltage can be locally applied for heating, conductivity measurement, driving liquid flow electrokinetically, electrophoresis etc in the liquid transport system of a microfluidic device while simultaneously observing the liquid through the plastic substrate at the location of heating, conductivity measurement etc.

A fourth object is to provide local microfluidic surface breaks and microfluidic boundaries between a hydrophilic surface area and a hydrophobic surface area that have an increased resistance for repeated passage of liquid.

These objects primarily aim at improvements of microfluidic devices intended for the transport of discrete aqueous liquid aliquots in the nl-range as defined elsewhere in this text, e.g. volumes $\leq 1000$ nl.

BRIEF DESCRIPTION OF THE DRAWINGS

The drawings illustrate results obtained in the experimental part.

FIG. 3A shows a microchannel structure that comprises an inlet port (1), a flow conduit or microchannel (3), a reaction microcavity (4) and an outlet port (2). FIG. 3B shows a microchannel structure that comprises an inlet port (1), a flow conduit or microchannel (3), a reaction microcavity (4), a reaction microcavity and/or a detection chamber (4) and an outlet port (2). FIG. 3C shows a microchannel structure having an inlet port (5) and (6), a volume-defining unit (7), a reaction microcavity (8), a valve (11), an outlet port or detection chamber (10) and a waste outlet (14). FIG. 3D shows a microhannel structure having inlet ports (15) and (16), a volume-defining unit (17), a valve (21) a reaction microcavity (18), an outlet port or detection chamber (19), a waste outlet (20).

FIG. 4A shows, schematically and not to scale, a cross section through an embodiment of a microchannel structure of the type shown in FIG. 3A. FIG. 4B shows, schematically and not to scale, a cross section through a second embodiment of a microchannel structure of the type shown in FIG. 3A. In FIGS. 4A and 4B the microchannel structure comprises an inlet opening (1), and outlet opening (2) and a functional unit such as a reaction microcavity (4) connected by a flow channel or conduit (3). These structures are defined between two planar substrates (22, 24). The microchannel structure has an inner wall (26), and portions of said inner wall are covered by a base layer comprising metal oxide (28). This base layer may be covered by one or more intermediate layers (30, 32) and this or these intermediate layers covered by a hydrophilic layer (34). Hydrophilic layer (34) may be the top layer of the assembly of layers. A detection unit (38) and a heating unit (40) may be provided.

DETAILED DESCRIPTION OF THE INVENTION

Figure 1:
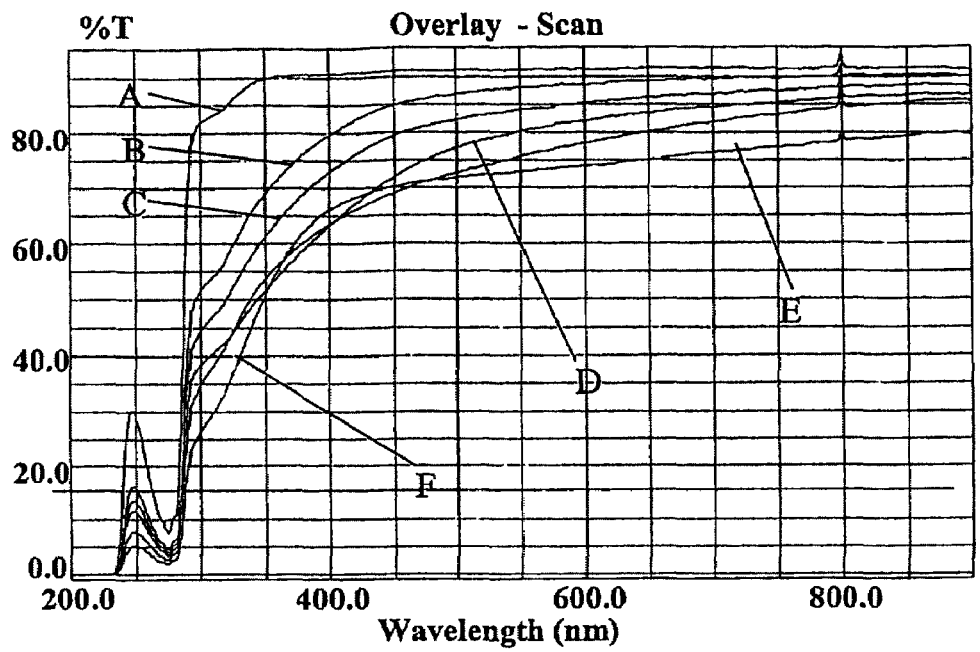
FIG. 1: Light transmission spectra for ITO films. The partial pressure of oxygen and number of scans have been varied during sputtering.

The present inventors have recognized that the above-mentioned objects can be achieved by introducing a layer comprising a metal oxide that can be obtained in transparent form. The layer is present in the inner wall between the plastic material of a substrate and the inner surface of the wall. The inner surface is exposed for liquid passing through the device.

Method of Manufacturing a Microfluidic Device (First Aspect)

The first aspect of the invention is a method for the manufacture of a microfluidic device in which there are one, two, three or more enclosed microchannel structures defined between two or more planar substrates as discussed above. Each of these microchannel structures comprises:

a) an inlet arrangement with an inlet opening to ambient atmosphere, b) a reaction microchamber downstream to the inlet opening, and c) an outlet opening to ambient atmosphere.

The method is based on earlier techniques in which two or more essentially planar substrates made of plastic material are apposed and joined to each other such that the corresponding part in each of said enclosed microchannel structures of the device is defined between the same pair of substrates. See for instance WO 9721090 (Gamera Biosciences), WO 9958245 (Amersham Pharmacia Biotech AB), WO 0056808 (Amersham Pharmacia Biotech AB), and WO 0147637 (Gyros AB).

Parts of a microchannel structures that are not defined between pairs of substrates are present as holes or depressions in the substrates. These holes may provide communication to ambient atmosphere (inlet and/or outlet openings) or between sections of a microchannel structure that are defined by different pairs of substrates.

The innovative method is characterized in comprising the steps of:

i) providing two essentially planar substrates I and II made of plastic material, each of which comprises on one of its sides (side $a_I$ and side $a_{II}$, respectively) surface areas (inner surface areas) that will define at least an upstream section of each of the microchannel structures when side $a_I$ and side $a_{II}$ are apposed and properly matched to each other;

ii) introducing a layer (base layer) that is hydrophilic and comprises metal oxide on said surface areas of either one or both of side $a_I$ and side $a_{II}$; and iii) apposing and adhering side $a_I$ and side $a_{II}$ such that said upstream section of each of said enclosed microchannel structures is formed.

The metal oxide layer is preferably introduced on a part of side $a_I$ and/or side $a_{II}$ that is to become a part of the inner surface of an upstream section (=upstream part).

The metal oxide layer comprises a metal oxide that is capable of forming a transparent layer that possibly also may be electrically conductive when properly manufactured. The term "properly manufactured" in this definition includes, for instance, that the layer has the appropriate thickness and/or is doped with and/or contains the appropriate metal atom/metal ions/metal oxide to provide a desired transparency and/or electrical conductivity.

An upstream section is a part of a microchannel structure that is upstream a reaction microcavity (RM), for instance upstream the most downstream reaction microcavity if there are two or more reaction microcavities in a microchannel structure. Thus, the term "an upstream section" contemplates either the part located between an inlet opening and a reaction microcavity (RM) or any subpart of such a part.

The terms "inner surface" or "inner surface area" will mean all or a part of the inner surface of a microfluidic device/microchannel structure. Depending on the context, the terms will also refer to a surface part in side $a_I$ and/or $a_{II}$ that is to become an inner surface when the sides are joined together (apposed) to define a section of a microchannel structure.

The method also comprises the step of apposing and adhering one or more additional essentially planar substrates for defining the remaining sections, if any, of the enclosed microchannel structures. In this case one or more metal oxide layers of the type discussed above and one or more additional layers (see below) may or may not be introduced into the sections of the microchannel structures that may be created in this way.

The variant described in the previous paragraph contemplates the manufacture of a microfluidic device in which different sections of a microchannel structure is defined between different pair of substrates. For instance, the side opposite (=side $a_{I_{opp}}$) to side $a_I$ in substrate I may be joined to side $a_{III}$ of a third substrate (III) to define another section of the microchannel structure than the section defined between substrates I and II. In this variant, substrate I typically has one or more microconduits (holes) passing through the substrate for providing communication between surface parts in side $a_I$ and $a_{Iopp}$ that are to become inner surfaces in the final device, i.e. these microconduits stretch between side $a_I$ and $a_{Iopp}$ (through substrate I). This variant includes that side $a_{Iopp}$ of substrate I has been modified by being covered by an intermediary planar substrate before being joined to side $a_{III}$ of substrate III, i.e. one of the sides of the intermediary planar substrate will in reality function as side $a_{Iopp}$ in step (iii). This kind of intermediary substrate thus may have through-passing holes/conduits in the same general manner as suggested for substrate I when there are sections of the microchannel structures that are defined between substrate I and a third substrate III.

Step (i). Substrates

The substrates are made of plastic materials selected among polymers that can be obtained by condensation polymerization, polymerization of unsaturated organic compounds or other polymerization reactions, and include also elastomers, such as silicone rubber polymers (for instance poly dimethyl siloxane) etc.

At the priority date of this invention the preferred plastics were polycarbonates and polyolefins that are based on polymerizable monomeric olefins that comprise straight, branched and/or cyclic non-aromatic structures. Typical examples are Zeonex™ and Zeonor™ from Nippon Zeon, Japan. This does not outrule the use of other plastics, for instance based on styrenes, methacrylates and/or the like. The term polymer includes also copolymer.

When a pair of planar substrates are apposed to define a microchannel structure or a section of thereof, one side in one or both of the substrates has/have been pre-fabricated to exhibit microstructures that will form at least a section of an enclosed microchannel structure when the two sides are apposed and properly matched. The microstructures may be created by various techniques such as etching, laser ablation, lithography, replication by embossing, moulding, casting etc, etc.

Each of substrate I and substrate II may be composed of two or more essentially planar substrates between which other sections of the microchannel structures than those defined between substrate I and II may or may not be defined. The manufacture of layered substrates that are to be used as starting substrates in the innovative method may or may not have involved introduction of a metal oxide layer as suggested by the present innovative concept, i.e. the metal oxide layer is on the inner surfaces of such layered starting substrates.

The material of a substrate to be used in the innovative method may or may not be transparent. In some variants the material/substrate is transparent at least below or above the base layer comprising a metal oxide.

Step (ii). Introducing a Layer Comprising Metal Oxide.

As discussed above, one or more metal oxide components of the metal oxide layer (base layer) are selected amongst those metal oxides that can be manufactured to a transparent metal oxide layer (at least for visible light), with preference for those metal oxides that also can be manufactured to an electrically conductive layer. The exact choice of components in the layer depends on what it is to be used for. For instance if the layer should only provide a surface with sufficient hydrophilicity as discussed below or as a support for a top layer providing a sufficient hydrophilicity and reduced fouling, one does not need to optimize the components in relation to each other with respect to sufficiently high conductivity and/or transparency of the base layer. It then suffices to select a metal oxide component amongst those that are able to give a transparent and/or electrically conducting metal oxide layer. The opposite is true if the transparency and/or the electrical conductivity as such of the base layer is to be utilized, for instance as a detection window, an electrical connection, for heating etc.

In preferred variants of the invention the base layer is transparent for visible light and/or is electrically conducting within the limits discussed below.

In preferred variants the base layer/metal oxide layer consists essentially of metal oxide, for instance selected as outlined herein.

Metal oxide layers that may be transparent and/or electrically conductive are well-known in the field. Typically they contain indium and/or tin oxide, titanium oxide, zinc oxide etc. In the case the optical and/or electrical properties of a given oxide are not sufficient for a desired use it may be doped or consist of a mixture of different oxides. Typical examples of metal oxides that may be both transparent and electrically conductive are indium tin oxide and zinc oxide doped with aluminum. The metal oxide, for instance titanium oxide, is typically in nano crystalline form, in particular if used alone. New alternatives for transparent and electrically conducting forms of metal oxides are under development. See for instance Cui et al., "Indium tin oxide alternatives—high work function transparent conducting oxides as anodes for organic light-emitting diodes", Adv. Mater. 13(19) (2001) 1476-1480.

The introduction of a metal oxide layer is done according to techniques well known in the field.

One main route is by depositing the appropriate metal layer or possibly the appropriate metal salt layer on the surface of the appropriate plastic substrate, and subsequently transforming the layer to the corresponding metal oxide layer. In the case of a metal layer, the transformation may be by treatment under oxidative conditions, for instance in an atmosphere containing oxygen or by wet chemical oxidation. The metal may be in the form of a suitable alloy.

Another main route is by depositing directly the appropriate metal oxide layer on the surface of the appropriate plastic substrate.

In both routes the metal layer and the metal oxide layer, respectively, can be introduced by sputtering, ball milling, evaporation, spin-coating a dispersion containing nanoparticles etc of the metal/metal oxide onto the surface. This in particular applies in the case the goal is to obtain a metal oxide layer that is transparent and/or is electrically conducting. A review on tin doped indium oxide films including electrical and optical properties as well as on their manufacture has been given by Ederth, Jesper "Electrical Transport in Nanoparticle Thin Films of Gold and Indium Tin Oxide".—Uppsala, 2003.—86p. (p 1-35)—(Comprehensive Summaries of Uppsala Dissertations from the Faculty of Science and Technology, ISSN 1104-232X; 790 ISBN 91-554-5499-2). An aerosol plasma fabrication method for the introduction of indium tin oxide and tin oxide thin films has been presented by Lee et al. (J. Mater. Res. 11(4) 895-)

Dispersions of metal oxide nanoparticles, e.g. containing indium tin oxide can be produced by a sol-gel method and used in spin-coating methods (see above).

It is important to select the proper method and/or conditions for the introduction of the base layer for avoiding negative effects on the surface of the plastic substrates. Thus methods and/or conditions that require high-energy input, for instance leading to a temperature increase of the plastic substrate close to or above its softening temperature should be avoided, in particular if the surface of the substrate has microstructures defining a microconduit. This applies to sputtering among others.

The metal oxide layer introduced may be post-treated to accomplish its final finish, for instance in a desired gas plasma such as an oxygen plasma.

The metal oxide layer (base layer) may be introduced stepwise. This includes that the base layer is introduced as sub layers where the upper sub layer is different from the sub layer on which it rests. This also includes that the metal oxide layer is introduced as a metal layer that subsequently is converted to the appropriate metal oxide layer.

In preferred variants so called sputtering is employed for the deposition by which is meant that a vapor of the appropriate oxide(s) is deposited on the intended part are of side $a_I$ and/or side $a_{II}$ of substrate I and II, respectively. The exact chemical characteristics of the surface after deposition will depend on the technique used, source of metal ions, atmosphere (e.g. oxygen content).

Sputtering conditions typically include a sputtering atmosphere containing oxygen in the range $\geq 1\%$, such as $\geq 5\%$ or $\geq 10\%$ or $\geq 20\%$ and $<100\%$, such as $\leq 70\%$, or $\leq 50\%$ or $\leq 40\%$.

The layer comprising metal oxide should exhibit characteristics within the following intervals:

a) Conductivity measured as surface resistivity should be: 1 Ohms/square-1000 kOhms/square, e.g. <1 kOhms/square or <20 Ohms/square. This does not exclude that even lower surface resistivities may be accomplished, for instance within the interval down to 1 mOhms/square, such as down to 0.01 or down to 0.1 Ohms/square. Electrically conducting layers are typically those that have surface resistivity $\leq 50$ Ohms/square or $\leq 40$ Ohms/square or $\leq 20$ Ohms/square.

b) Suitable thickness may be found within the interval of 1 nm-10000 nm, in particular 10 nm-1000 nm or 1 nm-1000 nm. The thickness is also typically $\leq 10\%$ of the smallest cross-sectional dimension of a microconduit at the metal oxide layer (which is also applicable to base layers that are thicker than 1000 nm and thinner than 1 nm).

c) Transparency is selected in the interval 0-100% for a wavelength in visible light, for instance at 550 nm. Depending on the particular microfluidic device in which the layer is present the transparency for visible light, for instance at 550 nm, may be in an interval selected amongst 0-90%, such as 0-80% or 0-70% or simply $\leq 50\%$, and 30-100% such as 40-90%, or $\geq 50\%$.

Step (ii) may contain a pre-step during which the substrate side comprising surface areas to be treated according to step (ii) is masked so that the base layer will only be introduced on selected parts. Thus surface areas may be masked if they a) will not define inner surfaces of microchannel structures and/or b) will define surface areas of inner surfaces of microchannel structures and for one reason or the other shall be left unaffected during step (ii).

Depending on the method used for introducing the metal oxide layer the mask may rest directly on the surface of the plastic substrate or kept at a certain distance above thus surface during the appropriate sub steps of step (ii).

If appropriate, step (ii) may also comprise one or more pre-steps in which the surface of the substrate is cleaned, a layer that assists in adhering the metal oxide to the surface of the plastic substrate is introduced etc. These kinds of treatments are generally known in field of coating plastics with layers of metals and/or metal oxides.

Step (iii). Adhering of Substrate I to Substrate II.

There are a number of techniques suggested in the literature for adhering the surface of two plastic substrates to each other.

One alternative is to press the surfaces together while heating selectively the surface not containing microstructures above its transition temperature while maintaining the other surface below its transition temperature. This alternative in particular applies when the surface not containing the microstructures is a nude plastics surface. Transition temperature refers to the transition temperature of the plastic material supporting the surface concerned.

In other alternatives, various kinds of adhesives or glues may be used. See WO 9424900 (Ove Öhman), WO 9845693 (Soane et al), U.S. Pat. No. 6,176,962 (Soane et al), WO 9956954 (Quine), and WO 0154810 (Dérand et al).

Thermolaminating may be used. See WO 0154810 (Dérand et al).

In order to reduce the amount of adhesive that is pressed into a microchannel during step (iii), the microchannel structures may be defined by microstructures in the form of relief patterns that are present in either one or both of the substrate surfaces. See WO 03055790 (Gyros AB) and US 2003/0129360 (Gyros AB).

Adhesives may be selected as outlined in U.S. Pat. No. 6,176,962 and WO 9845693 (Soane et al). Thus suitable bonding materials include elastomeric adhesive materials and curable bonding materials. These kinds of adhesive materials as well as others may be in liquid form when applied to a substrate surface. Bonding materials including adhesives thus comprises liquid curable adhesive material and liquid elastomeric material. After application to a substrate surface, the adhesive material is rendered more viscous or non-flowable, for instance by solvent removal or partial curing, before the other substrate is contacted with the adhesive. The term "liquid form" includes material of low viscosity and material of high viscosity.

Curable adhesives include polymerizable adhesives and activatable adhesives. Thermo-curable, moisture curable, and bi-, three- and multi-component adhesives are also examples of curable adhesives.

If a mask has been introduced in connection with step (ii), it is typically removed before step (iii).

Additional surface layers that are introduced prior to step (iii) may negatively affect the joining of substrate I and II to each other. This kind of problems can be avoided by proper masking during the introduction of the layers, i.e. masking of surface areas that are used for adherening the substrates to each other.

Introduction of Additional Layers on the Metal Oxide Layer.

The metal oxide layer introduced in step (ii) may have a pronounced fouling activity in spite of its hydrophilicity. It is therefore many times advisable to introduce one or more additional layers. These extra layers may be introduced either before and/or after step (iii).

An additional layer that will be exposed to a liquid passing through the microchannel structure in the final device will be called the top layer. Additional layers between the top layer and a base layer (typically the metal oxide layer) will be called intermediary layers and are typically used for supporting the adherence of the top layer to the base layer. Each of the additional layers will typically cover at least a part of or the same inner surface area as the metal oxide layer and/or other inner surface areas that are not covered by the metal oxide layer. If there are no additional layer the base layer will also be a top layer.

The most extensive top layer is typically hydrophilic and exposes a plurality of non-ionic hydrophilic groups to a liquid passing through the microchannel structure. The top layer should have a low fouling activity. A plurality of the hydrophilic groups may be attached to a base skeleton that may be polymeric and provide for multi-site attachment to the underlying support layer, for instance the base layer. Alternatively a limited number of hydrophilic functional groups (e.g. 1, 2, 3, 5, 6 etc, such as $\leq 10$) is attached to one end of a hydrocarbon chain while the other end have a functional group that attaches to the underlying layer, for instance the base layer (metal oxide layer). The hydrocarbon chain may be straight (unbranched) or branched possibly comprising a cyclic structure.

The term "non-ionic hydrophilic groups" excludes groups that have a pH-dependent charge at moderate pH (e.g. amino groups, carboxy groups etc), i.e. acid groups that have pKa within the interval 0-12 and corresponding base groups.

A hydrophobic top layer typically is capable of exposing a plurality of hydrophobic groups (e.g. hydrocarbon/hydrocarbyl group) to the interior of a microchannel structure.

The top layer may be a so-called mono-layer that may or may not be self-assembled as illustrated in the publications cited under the heading "Background publications", for instance from a solution comprising bifunctional compounds/reagents in which the two functions are separated by an hydrocarbon chain.

A hydrophilic top layer may be present in the inner surfaces provided by either one or both of the planar substrates defining a particular section of a microchannel structure.

A hydrophilic top layer may extend throughout a microchannel structure with exception for locations where hydrophobic structures are needed (hydrophobic valves, anti-wicking means, microconduits that are solely used as air/gas vents etc). The hydrophobic surface characteristics may be introduced by the appropriate combination of masking and introduction of hydrophobic and hydrophilic top layers. One alternative comprises the steps of a) masking the locations where a hydrophobic top layer is to be introduced before introduction of the hydrophilic top layer, b) introducing the hydrophilic top layer on unmasked areas, c) demasking, c) masking the hydrophilic top layer selectively, d) introducing the hydrophobic top layer on unmasked portions, and e) demasking. Another alternative is the other way round, i.e. start with masking the surfaces that are to carry the hydrophilic top layer. Still another alternative comprises the steps of a) coating all surfaces of a substrate that are to become inner surface in the final device with a hydrophilic or a hydrophobic top layer, b) masking the locations at which that there shall be a top layer having a hydrophilic/hydrophobic balance that is different from the first introduced top layer, c) introducing the different top layer on unmasked portions, and d) demasking.

Each of the non-ionic hydrophilic groups in the top layer comprises a non-chargeable functional group attached to carbon that preferably is $sp^3$-hybridized. The kind of functional groups concerned typically comprise one or more heteroatom selected from oxygen and nitrogen. Examples of preferred hydrophilic functional groups are hydroxy (HO—) where the free valence binds to carbon; —O(CH$_2$CH$_2$O)$_n$— where n is 1 and at least one of the free valences binds to carbon and at most one valence to hydrogen; amido (—CON<), where at least one of the free valences binds to carbon and at most two valences bind to hydrogen; ester (—C(=O)O—), where each of the free valences binds to carbon; sulphone (—S(=O)$_2$—) where each free valences binds to carbon; etc. The hydrophilic group may be polymeric, i.e. comprise repetitive units in which there are hydrophilic functional groups. Typical non-ionic polymeric hydrophilic groups are e.g. —O(CH$_2$CH$_2$O)$_n$—, —(CH$_2$CH(OH))$_n$—, —(CH$_2$CH(O-alkylene-O—X))$_n$—, etc where n is integers >1, typically $\geq 25$ or $\geq 100$, X is hydrogen or alkyl and may differ between the repetitive units within the same group/molecule, and at least one of the free valences binds to carbon and at most one valence to hydrogen. Alkyl and alkylene refer to groups that have unbranched or branched hydrocarbon chains in which the carbon chain may be broken or ended with an oxygen atom such that there are at most two or three carbon atoms per oxygen atom in the alkyl/alkylene group. In many cases alkyl/alkylene primarily refers to pure C$_{1-4}$ alkyl/alkylene groups. Carbon primarily refers to $sp^3$-hybridized carbon.

Typical non-ionic hydrophilic polymeric groups are present in polymers such as polyhydroxy alcohols, e.g. polysaccharides (dextran, xylan, starch etc), polyvinyl alcohol, poly (vinyl hydroxyalkyl ethers) etc; polyethylene oxides and various ethylene oxide alkylene oxide copolymers; polyamides such as polyacrylamide and poly methacrylamides, polyesters such as poly hydroxy lower alkyl methacrylates and acrylates etc.

A non-ionic hydrophilic polymeric group may be covalently or non-covalently associated with a non-ionic hydrophilic or ionic or ionizable poly electrolytic polymer base skeleton. A polyeletrolytic base skeleton may comprise positive and/or negative charges.

The layers may be attached to each other covalently or non-covalently. Non-covalent attachment comprises Van der Waals bonding, hydrogen bonding, electrostatic attraction etc. Thus in the case a layer has positively charged groups a neighboring layer may have negative charges, in the case a layer has hydrophopic groups a neighboring layer may have hydrophobic groups etc. Covalent attachment of layers to each other and intra-layer cross-linking are typically accomplished simultaneously with and/or subsequent to the formation of a layer on an inner surface (after step (iii)), or on a substrate surface that is to become an inner surface (before step (iii)). The techniques used are well known in the field.

Suitable techniques for the introduction of an additional layer can be illustrated with:

a) Deposition from a gas plasma based on organic precursor molecules as described in WO 03086960 (Gyros AB) and US 2003/0213551 Gyros AB).

b) Coating with non-ionic polymer, possibly linked to a base skeleton that may be charged or uncharged as outlined in WO 0147637 (Gyros AB). See also U.S. Pat. No. 6,236,083 (Caliper).

c) Reacting the surface of the metal oxide layer or of some other pre-introduced layer with an at least bifunctional reagent in which one functional group (I) is capable of linking the reagent via a covalent bond or some other stable link to the surface leaving some of the other functional groups (II) of the reagent exposed on the new surface created. The reagent will define a layer, possibly with the functional groups (II) defining the chemical characteristics of its surface.

Typically the functional groups in the reagent used according to alternative c) above are 1) electrophilic if they are intended to react with nucleophilic groups, 2) nucleophilic if they are intended to react with electrophilic groups, and 3) contain a polymerisable unsaturation if the additional layer is to be introduced by graft polymerization of compounds comprising unsaturation (carbon-carbon double and/or triple bond).

The layer introduced according to alternative c) may be a monolayer as discussed above, for instance self-assembled. This may be accomplished by bifunctional reagents comprising two end functional groups, e.g. selected from thiol, hydroxy, amino, hydrocarbyl, carboxy, phosponate, alkene, reactive silane, hydrocarbyl (=hydrocarbon group) etc, and a hydrocarbon chain separating the two end groups. A monolayer exposing hydroxy groups can be accomplished, if one functional group of the reagent is hydroxy and the other end group has a higher tendency than hydroxy to coordinate to the underlying surface. A monolayer exposing a hydrophobic surface can be accomplished if one end group is a hydrocarbon group and the other end group has a higher tendency than the hydrocarbon group to attach to the surface. By using a defined mixture of reagents that provide surfaces with pronounced hydrophilic and hydrophobic groups, respectively, top surfaces with defined intermediary hydrophilic/hydrophobic surface characteristics can be envisaged. Monolayers may be used as top layers.

An additional layer may be introduced prior to step (iii) according to any of steps a) to c). This includes dipping and incubating the appropriate sides of substrates with the appropriate solutions and/or the use of printing or spray techniques, such as ink jet and stamping techniques. Introduction of an additional layer after step (iii) requires that the proper solutions are dispensed through in inlet opening of a microchannel structure.

The additional layers may or may not be transparent.

The various kinds of additional layers discussed above, in particular a top layer, may also be present on inner surfaces that lack a base layer in the form of a metal oxide layer.

The fouling activity and wettability (hydrophilicity) of the top layer should be essentially within the limits given under the heading "microfluidic device".

The Microfluidic Device (Second Aspect)

This aspect is a microfluidic device comprising one, two, three or more enclosed microchannel structures, each of which comprises a) an inlet arrangement with an inlet opening to ambient atmosphere, b) a reaction microcavity (RM1) downstream to the inlet opening, and c) an upstream section that i) is located between the inlet opening and the reaction microcavity (RM1) and ii) is defined between two planar substrates made of plastic material.

The two substrates that define an upstream section typically also define the corresponding upstream section in the other microchannel structures of a microfluidic device.

The characteristic feature is that the inner wall in an upstream section of each of the microchannel structures exposes a hydrophilic surface area with an underlying transparent base layer comprising metal oxide.

A reaction microcavity (RM, such as RM1) is a microcavity in which a reaction is to take place. The reaction may involve two or more reactants one or more of which may be immobilized to a solid phase that is present in the reaction microcavity. The reactants utilized may comprise affinity reactants of the kind illustrated below and/or one or more reactants that are converted to a structural new entity by breaking and/or formation of one or more covalent bonds. Reactants of catalytic systems such as enzymatic systems are often included (e.g. an enzyme, a substrate, a cofactor, a coenzyme, a cosubstrate etc).

The terms "upstream" and "downstream" in the various aspects of the invention refer to the flow direction in a microchannel structure and means that a liquid flow passes an upstream position before a downstream position. In the case the flow is passing back and forth between an upstream position, such as the upstream section, and a downstream position, such as reaction microcavity RM1, the terms refer to the first time the liquid flow passes between the positions.

The microfluidic device may also comprise additional microchannel structures that may or may not have a section defined between the same pair of substrates as the section of the microchannel structures referred to in the preceding paragraphs. These additional microchannel structures may or may not comprise an inner wall exposing a hydrophilic surface and/or a supporting base layer (metal oxide layer) as discussed above.

In addition to the base layer there may be a separate top layer and possibly also intermediary layers between the base layer and the top layer as discussed for the first aspect.

Details of the different layers have been discussed in the context of the first aspect.

The number of microchannel structures of the innovative kind per device is typically $\geq 10$, such as $\geq 25$ or $\geq 90$ or $\geq 180$ or $\geq 270$ or $\geq 360$.

The terms "microchannel", "microconduit", "microvolumes" etc., contemplate that a channel structure comprises one or more cavities and/or conduits that have a cross-sectional dimension that is $\leq 10^3$ µm, preferably $\leq 5 \times 10^2$ µm, such as $\leq 10^2$ µm. The lower limit for cross sectional dimensions is typically significantly larger than the size of the largest constituent of a liquid that is to pass through a microconduit of the innovative device. The volumes of microcavities and liquids to be processed are in the µl-range, i.e. $\leq 5000$ µl, such as $\leq 1000$ µl or $\leq 100$ µl or $\leq 10$ µl, and includes the nanoliter (nl) range and picoliter (pl) range. The nl-range has an upper end of 5000 nl and relates in most cases to volumes $\leq 1000$ nl, such as $\leq 500$ nl or $\leq 100$ nl. The pl-range has an upper end of 5000 pl and relates in most cases to volumes $\leq 1000$ pl, such as $\leq 500$ pl or $\leq 100$ pl.

A microcavity may have the same or different cross-sectional dimensions as any of the microconduits directly attached to the microcavity.

Microcavities that are in the upper part of the µl-range ($\geq 1$ µl) are typically directly connected to inlet ports and intended for application of sample and/or washing liquids.

Each microchannel structure may comprise one, two, three or more functional parts selected among: a) inlet arrangement comprising for instance an inlet port/inlet opening, possibly together with a volume-metering unit, b) microconduits for liquid transport, c) reaction microcavity (RM); d) mixing microcavity; e) unit for separating particulate matters from liquids (may be present in the inlet arrangement), f) unit for separating dissolved or suspended components in the sample from each other, for instance by capillary electrophoresis, chromatography and the like; g) detection microcavity; h) waste conduit/microcavity; i) valve; j) vent to ambient atmosphere; etc. Many of these parts may have one or more functionalities. A reaction microcavity and a detection microcavity may for instance coincide. Another example is a reaction microcavity that contains a solid phase bound reactant to which a soluble reactant, a product from a reaction taking place in the reaction microcavity or in an upstream microcavity, etc can bind may function as a combined reaction, separation and detection microcavity. There may also be collecting microcavities in which a substance, which has been separated, formed or otherwise processed in a microchannel structure are collected and transferred to some other instrument, for instance an analytical instrument such as a mass spectrometer. Various kinds of functional units in microfluidic devices have been described by Gyros AB/Amersham Pharmacia Biotech AB: WO 9955827, WO 9958245, WO 02074438, WO 0275312, WO 03018198, WO 03024598 and by Tecan/Gamera Biosciences: WO 0187487, WO 0187486, WO 0079285, WO 0078455, WO 0069560, WO 9807019, WO 9853311.

An inlet arrangement may be linked to one single microchannel structure or be common for a subgroup of microchannel structures, e.g. for 2, 3, 4 etc up to 10 or up 15 or up to 20 microchannel structures, and comprises an inlet port and typically one volume-defining unit per microchannel structure associated with the inlet port. At the downstream end of each volume-defining unit, there is typically a valve function that will prevent leakage of liquid from the inlet arrangement/volume-defining unit into the downstream part of the microchannel structure associated with the volume-defining unit. This valve function is typically of the non-closing type such as a passive valve for instance based on a hydrophobic break or barrier. See for instance WO 02074438, WO 0275312, WO 03018198, WO 03024598, US 2003/0044322 and US 2003/0053934.

The microfluidic device may also comprise common channels connecting different microchannel structures, for instance common distribution channels for introduction of liquids and common waste channels including waste reservoirs. Common channels including their various parts such as inlet ports, outlet ports, vents, etc., are considered part of each of the microchannel structures they are communicating with.

The above-mentioned units, microcavities and microconduits may have a hydrophilic inner surface with an underlying base layer comprising a metal oxide layer as outlined for the first aspect of the invention. These units are present in an upstream section as defined above or downstream reaction microcavity RM1. This kind of inner surface/inner wall may also be present in reaction microcavity RM1, e.g. on one, two, three or four sides of the inner wall.

A reaction microcavity may comprise a solid phase to which a reactant is immobilized (covalently or by adsorption). Typical solid phases are porous monolithic beds, i.e. porous plugs in a microconduit, packed beds in the form of porous and/or non-porous particles, and the inner surface of the reaction microcavity. Potentially also fluidised beds of porous and/or non-porous particles may be of interest. The reactant is typically selected from affinity, reactants, for instance bioaffinity reactants, and other reactants.

The reactant may be immobilized directly to the solid phase without any coating or via a coating exposing non-ionic hydrophilic groups that may be selected among the same kinds as described for the top layer. The wettability and/or a reduced fouling activity of the surface of the coating may be as described elsewhere in this specification.

The immobilized reactant (ligand) is typically capable of affinity binding or covalently binding to a reactant that is dissolved or suspended as particulates in a liquid that is to pass the reaction microcavity. Covalent binding, if utilized may be reversible, for instance by thiol-disulfide exchange (e.g. the ligand is immobilized via a so-called reactive disulfide or a thiol group). Affinity binding (=affinity adsorption) can be illustrated with:

(a) electrostatic interaction that typically requires that the ligand and the entity to be bound have opposite charges, (b) hydrophobic interaction that typically requires that the ligand and the entity to be bound comprises hydrophobic groups, (c) electron-donor acceptor interaction that typically requires that the ligand and the entity to be bound have an electron-acceptor and electron-donor group, respectively, or vice versa, and (d) bioaffinity binding in which the interaction is of complex nature, typically involving a mixture of different kinds of interactions and/or groups.

Ion exchange ligands may be cationic (=anion exchange ligands) or anionic (=cation exchange ligands). Typical anion exchange ligands have positively charged nitrogen, the most common ones comprising one or more groups selected amongst primary, secondary, tertiary or quaternary ammonium groups, and certain amidinium groups. Typical cation exchange ligands have negatively charged oxygen, the most common ones comprising one or more groups selected amongst carboxylate groups, phosphate groups, phosphonate groups, sulphate groups and sulphonate groups.

Bioaffinity binding includes that the reactant (ligand) on the solid phase is a member of a so-called bioaffinity pair and the reactant to be bound by affinity binding is the other member of the pair. Typical bioaffinity pairs are a) antigen/hapten and an antibody/antigen binding fragment of the antibody; b) biotin and compounds that are capable of affinity binding biotin (e.g. strepavidin, avidin, neutravidin and other compounds having comparable or stronger affinity and specificity for biotin); c) complementary nucleic acids; d) immunoglobulin-binding protein and immunoglobulin (for instance IgG or an Fc-part thereof and protein A or G), e) lectin and the corresponding carbohydrate, etc. The term "bioaffinity pair" includes affinity pairs in which one or both of the members are synthetic, for instance mimicking a native member of a bioaffinity pair, being a metal ion chelate (IMAC) etc. The term antibody includes also other binding members that have comparative binding abilities for antigens/haptens, such as affibodies, single chain antibodies, chimeric antibodies etc.

Different principles may be utilized for transporting the liquid within the microfluidic device/microchannel structures between two or more of the functional parts described above. Inertia force may be used, for instance by spinning the disc as discussed in the subsequent paragraph. Other forces are capillary forces, electrokinetic forces, non-electrokinetic forces such as capillary forces, hydrostatic pressure etc.

The microfluidic device typically is in the form of a disc. The preferred formats have an axis of symmetry (Cn) that for disc shaped variants is perpendicular to or completely within the disc plane. n is an integer $\geq 2$, 3, 4 or 5, preferably $\infty$ (C$\infty$). In other words the disc may be rectangular, such as square shaped, and other polygonal forms but may also be circular. Once the proper disc format has been selected centrifugal force may be used for driving liquid flow. Spinning the device around a spin axis that typically is perpendicular or parallel to the disc plane creates the necessary centrifugal force. The spin axis does not necessarily intersect the disc. In the most obvious disc-shaped variants at the priority date, the spin axis coincides with the above-mentioned axis of symmetry and or is parallel with the disc plane without being common with the plane of the disc. See for instance PCT/SE03/01850 (Gyros AB).

The inner surfaces should have a low fouling activity (=essentially devoid of fouling activity), in particular the top surface introduced according to the first aspect of the invention (except for the case when the metal oxide layer as such is exposed in the surface of the top layer). The effect of a coating (primarily the top layer) on the fouling activity can be measured as the ratio between adsorption of a model protein to the top surface and to the naked plastic surface. This ratio should typically be $\leq 0.75$, such as $\leq 0.50$ or $\leq 0.25$ and is called decrease ratio in the major part of the inner surfaces upstream a reaction microcavity in a microchannel structure for at least one selected model protein. Decrease ratio $\leq 0.75$ for an inner surface means that the surface is essentially devoid of nonspecific adsorption. A high ratio in a certain part of these inner surfaces may be compensated with a lowered value in one or more of the other parts. The ratio can be even lower, for instance ≦0.10. The measurement of decrease ratio can be performed as presented in WO 03086960 (Gyros AB) and US 2003/002134551(Gyros AB). Typical model proteins may be selected amongst serum albumin from various species, such as bovine or human serum albumin, or immunoglobulin (Ig) of various types (IgG, IgA etc) and from various species (human, bovine, rabbit etc).

In the context of the invention the term "wettable" (hydrophilic) with respect to a surface means that a surface has a water contact angle ≦90°. The term "non-wettable" (hydrophobic) refers to surfaces that have contact angles ≧90°. In order to facilitate good transport of a liquid between different functional parts of the inventive microfluidic devices, the water contact angle in the individual parts should primarily be wettable, preferably with a contact angle ≦50° such as ≦40° or ≦30° or ≦20°. In particular the wettability should be adapted such that an aqueous liquid will be able to fill up an intended microcavity by capillarity (self suction) once the liquid has started to enter the cavity (=hydrophilic microconduit/microcavity). A hydrophilic inner surface in a microchannel structure may comprise one or more local hydrophobic surface breaks in the hydrophilicity, for instance for introducing a passive valve, an anti-wicking means, a vent solely function as a vent to ambient atmosphere etc. The surface break thus comprises a boundary between a hydrophilic surface and a hydrophobic surface. The hydrophobic surface at the break typically is non-wettable with a water contact angle ≧90°, such as ≧100° or ≧110° or ≧120°. The difference in wettability across the boundary typically is ≧50°, such as ≧60° or ≧70°. The boundary may stretch across the top surface between two length-going edges that delineate one side of an inner wall in a microconduit if it is used for valving, anti-wicking means, venting purposes etc. The boundary may similarly also be present at about the same position in one, two or other inner sides.

All contact angles refer to values at the temperature of use, typically 25° C., are static and can be measured by the method illustrated in WO 0056808 (Gyros AB) and WO 0147637 (Gyros AB).

The Third Aspect of the Invention

A separate aspect of the invention is a microfluidic device comprising one, two or more microchannel structures which each has a reaction microcavity (RM) comprising a solid phase with a solid phase bound reactant. The characteristic feature is that the solid phase and/or the inner wall of the reaction microcavity (RM) has/have a coating comprising a metal oxide layer (base layer) as discussed above. The coating may comprise a top layer and one or more intermediary layer as discussed for the other aspects of the invention. The top surface is defined by the metal oxide layer or as a separate top layer exposing non-ionic hydrophilic groups on its surface as discussed for the other aspects of the invention. The top surface has a wettability, and possibly also a reduced fouling activity, as discussed for the top surface of the coating according to the first and second aspect of the invention. The innovative coating may be present in one, two, three, or four of the inner sides of the inner walls of the reaction microcavity.

The device of the third aspect may or may not have the inventive coat in other parts of the microchannel structures. The reaction microcavity concerned in this aspect is typically the most downstream reaction microcavity.

Specific other features of this aspect are apparent under the heading "Microfluidic Device" and "Method of manufacturing a microfluidic device".

The Fourth Aspect of the Invention (Hydrophobic Surface Areas Defining Local Surface Breaks).

Local hydrophobic surface breaks in hydrophilic inner walls of microfluidic devices for use as passive valves, vents, anti-wicking means etc have been introduced by spraying, printing or painting the appropriate hydrophobic pattern with a substance that poorly attach to plastic surfaces. This aspect of the invention relates to problems associated with the stability of local microfluidic hydrophobic surface breaks that are to be passed repeatedly by liquid.

This aspect is represented by a hydrophobic surface break in a hydrophilic surface and is typically local. The break comprises a boundary between the hydrophilic surface and a hydrophobic surface. The boundary or break stretches between two length-going edges delineating an inner side of an inner wall in a microconduit. For a definition of length-going edges see WO 0274438 (Gyros AB). The boundary may be present in one, two, three or more inner sides at the same essentially position in the microconduit. The innovative hydrophobic surface break is characterized in that the top layer comprising the hydrophobic surface area is covalently attached to the upper surface of the layer on which the to top layer is resting. The hydrophobic surface groups (primarily hydrocarbon groups) are thus part of an organic compound that bridges from the top surface to the layer beneath the top layer and typically attaches covalently to this latter layer. This underlying layer may be a) the plastic surface as such, b) the metal oxide layer (base layer) discussed above if present, c) an intermediary layer located i) between the surface of the plastic substrate and the top layer, or ii) between the top layer and a metal oxide layer (base layer) if present. The intermediary layer may also be the top layer of the hydrophilic surface area on the other side of the boundary which layer then extends under the layer exposing the hydrophobic top surface.

Variants are characterized in that the water contact angles for the hydrophobic and hydrophilic surface areas defining the boundary are characterized to be within the ranges discussed above. The difference in water contact angles may be as discussed for the second aspect.

The hydrophobic and hydrophilic surface areas that define the boundary of the innovative surface breaks may expose hydrophobic and hydrophilic groups, respectively, as discussed for the first aspect of the invention. The respective layer may be introduced as discussed for the first aspect.

This aspect of the invention primarily concerns passive valves and/or anti-wicking means in microconduits used for liquid transport in microchannel structures of microfluidic devices.

Experimental Part

Sputtering of ITO

ITO (indium tin oxide, 90% $In_2O_3$-10% $SnO_2$), thin films on Zeonor (Zeon Corp, Japan ) substrate have been deposited by a DC (MRC 902, ESC, Equipment Support Company Ltd, Cambridge, U.K.) magnetron sputter without heating. The optical and electronic properties of the film are highly dependent of the sputtering parameters and the physical properties of the starting material.

The parameters used in the experiments are according to Table 1. Gas 1 representing Argon and Gas 2 representing Oxygen. This particular case showing the sputtering conditions for 10% O partial pressure.

TABLE 1

Set up conditions for sputtering of ITO with the partial pressure of Oxygen being 10%. Set Up Target 1 ITO

| | |
|---|---|
| Pre Sput Time (secs) | 20 |
| Gas 1 Flow/sccm) | 50 |
| Gas 2 Flow/sccm) | 5 |
| Power Level (kw) | 1 |
| No. of Scans | 4 |
| Scan Speed (cm/min) | 200 |

Optical Properties of the ITO Films

High conductivity, or low resistance, in the visible region is balanced against high transmission, and are dominated by the ratio of O partial pressure and film thickness, given by number of scans and scan speed.

In FIG. 1 the ratio of O partial pressure and number of scans (scan speed at 200 cm/min) were varied giving films with different thickness and optical transmission.

For the green light (550 nm) 90% transmission was achieved for O partial pressure of 40% and 20%, and 4 scans. The transmission is believed to increase if the number of scans is decreased to 2. In the figure A is untreated Zeonor™; B is 40% oxygen 4 scans; C is 20% oxygen 4 scans; D is 10% oxygen 4 scans; E is 1% oxygen 4 scans; and F is 10% oxygen 8 scans.

Electrical Properties

The deposited layer must contain a high density of charge carriers for it to conduct electricity. These carriers are free electron and oxygen vacancies, and an excessive population produces absorption. High conductivity, low resistance, is balanced against high transmission in the visible region. The ITO films with around 90% transmission have a resistance more than 100 Ohms/square. For films with-transmission below 75%, resistance of 30 ohms/square was obtained.

Contact Angle of the ITO Films

For films sputtered according to Table 1 (partial O pressure of 10% and 4 scans) the static water contact angles direct after the deposition varied between around 20-30°. After storage for 4 weeks in Al-folio the static water contact angle was 21° after wash with 95% EtOH. This is a strong indication that acceptable storage stability for storage at longer times such as more than one, two, three months are likely to be reached with this kind of surface modification.

Microfluidic Test

A Mylar OL2 lid (Dupont) (substrate I) was laminated to the surface of a circular plastic disc (substrate II) having CD-dimensions. The surface of the disc comprised open microchannel structures arranged annularly around the centre of the disc with inlet ends more close to the centre than the outlet ends. The lid had holes matching the inlet and outlet ends of the microchannel structures. Indium tin oxide was sputtered as outlined above on the substrate surface that comprised the open microchannel structures. The laminated structure (=microfluidic device) thus comprised a number of enclosed microchannel structures having inner surfaces of ITO (hydrophilic).

The microfluidic test was performed by applying a drop of water at the inlet end of each microchannel structure. Each drop was momentarily sucked by capillarity into the corresponding microchannel structure. As comparison the same experiment was performed with the same kind of microfluidic device in which the inner surfaces were untreated plastics (hydrophobic). In this case the drops remained outside the microchannel structures.

Non-specific adsorption of protein to a non-ionic hydrophilic top layer with an underlying base layer of indium tin oxide PEG-PEI/ITO Surface A conjugate (PEG-PEI) of polyethylene imine (PEI) and epoxy-methoxy-PEG was synthesized by reacting 0.43 g Lupasol Sk (BASF, Germany, 24 wt-% in PEI according to the manufacturer) with 5 g epoxy-methoxy-PEG (Shearwater Polymers, Inc, Huntsville, Ala., USA). The conjugate was then adsorbed from an aqueous solution (pH about 7.8) for 1 h onto an ITO surface on polystyrene obtained as described above (partial O pressure of 10% and 4 scans). Subsequent to adsorption the surface was rinsed with water and dried under nitrogen. The adsorbed layer had a contact angle of 28°. The procedure was as outlined in WO 0147637 (Gyros AB).

Protein adsorption to the PEG-PEI/ITO-surface was studied by an ELISA-method. PEG-PEI/ITO surfaces were thus incubated with 100 µl rabbit immunoglobulin solution at three different concentrations (0.5; 5: 50 µg/ml) in PBS over night at room temperature. Thereafter each surface was washed three times with PBS/Tween (10 mM phosphate and 0.15 mM NaCl). For quantifying the amount of rabbit IgG adsorbed to the surfaces, each surface was incubated with 90 µl HRP conjugated anti-rabbit IgG antibody, concentration 1 µg/ml, during 90 min. To each mixture was then added 90 µl of TMB (tetra methyl benzidine) substrate and absorbance was followed at 640 nm. After 5 min incubation 90 µl TMB stop solution was added and absorbance at 405 nm was detected.

PEG/PEI/SiOx Surface

A glass like SiOx layer was created by hexamethyldisiloxane (HMDSO) plasma deposition on a polystyrene surface generating a hydrophilic glass like surface (SiOx) according to a standard method recommended by the manufacturer of the instrument used (CVD Piccolo from Plasma Electornic (Neuenburg, Germany)). In a first step the polystyrene surface was treated in argon/oxygen plasma to clean the surface and to get good adhesion of a subsequently deposited layer. Subsequently SiOx was deposited from HMDSO plasma followed by an oxidizing step. The process parameters are:

| | Precleaning and adhesion promoter | HMDSO Deposition | Post oxidation |
|---|---|---|---|
| Base pressure (mPa) | 20 | 250 | 250 |
| Homogen time (s) | 20 | 90 | 0 |
| Power generator (%/V) | 45/270 | 40/240 | 65/390 |
| Treatment time (s) | 0 | 110 | 10 |
| Flushing time (s) | 0 | 0 | 3 |
| Flow gas 1 (%) | 32%-$O_2$ | 50%-$O_2$ | 50%-$O_2$ |
| Flow gas 2 (%) | 18%-Ar | 0 | 0 |
| Flow of HMDSO (%) | 0 | 5% | 0 |

PEG-PEI obtained as described above was then adsorbed to the SiOx surface. Protein adsorption was studied in the same manner as for the PEG-PEI/ITO surface.

PEG-PEI Surface

A polystyrene surface (PS) was hydrophilized in oxygen plasma and adsorbed with PEG-PEI as outlined in WO 0056808 (Gyros AB) and WO 0147637 (Gyros AB). Protein adsorption was studied in the same manner as for the PEG-PEI/ITO surface.

Nude Polystyrene Surfaces

Protein adsorption directly to a polystyrene surface was studied in the same manner as for the PEG-PEI/ITO surface.

Figure 2:
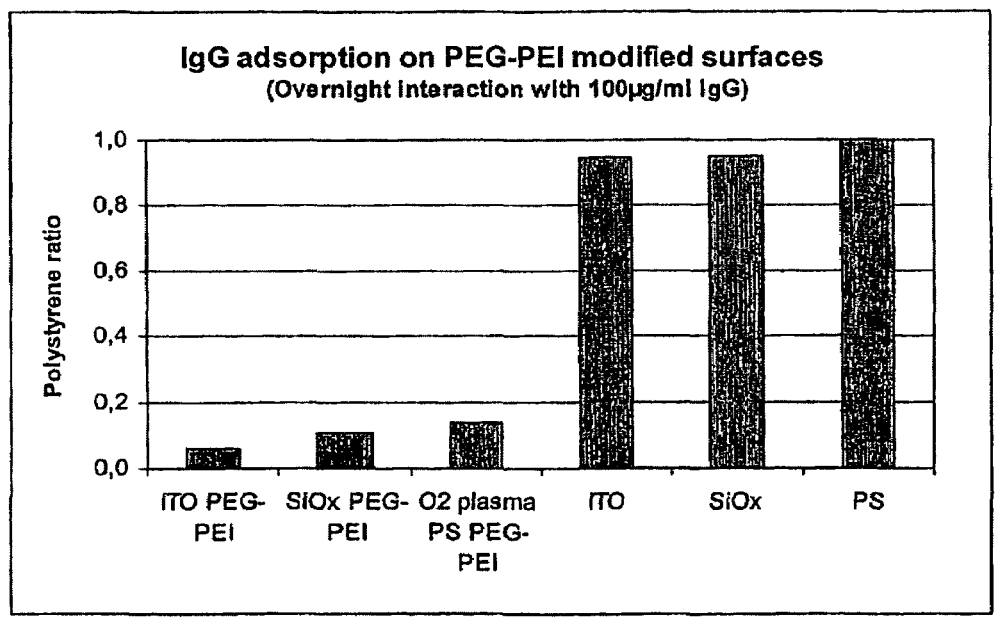
FIG. 2: IgG adsorption on surfaces of inner walls comprising a metal oxide layer (indium tin oxide) compared to a nude polystyrene surface.
Figure 3A:
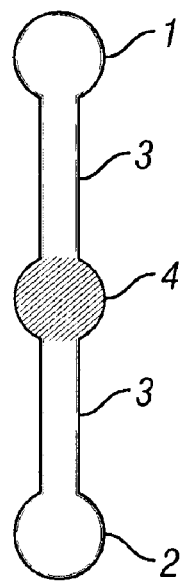
FIGS. 3A-3D show various microchannel structures.
Figure 3B:
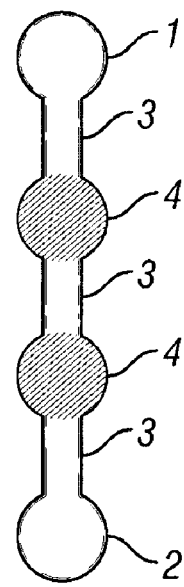
Figure 3C:
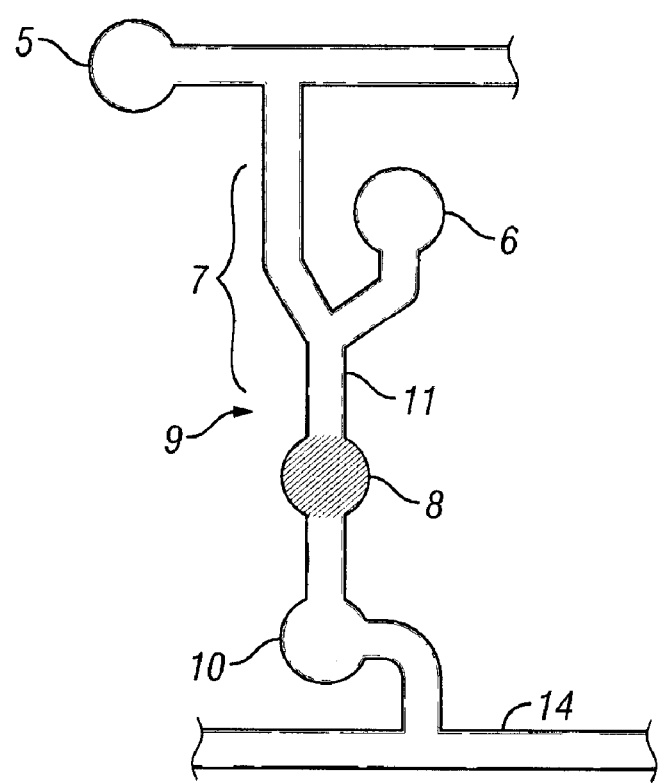
Figure 3D:
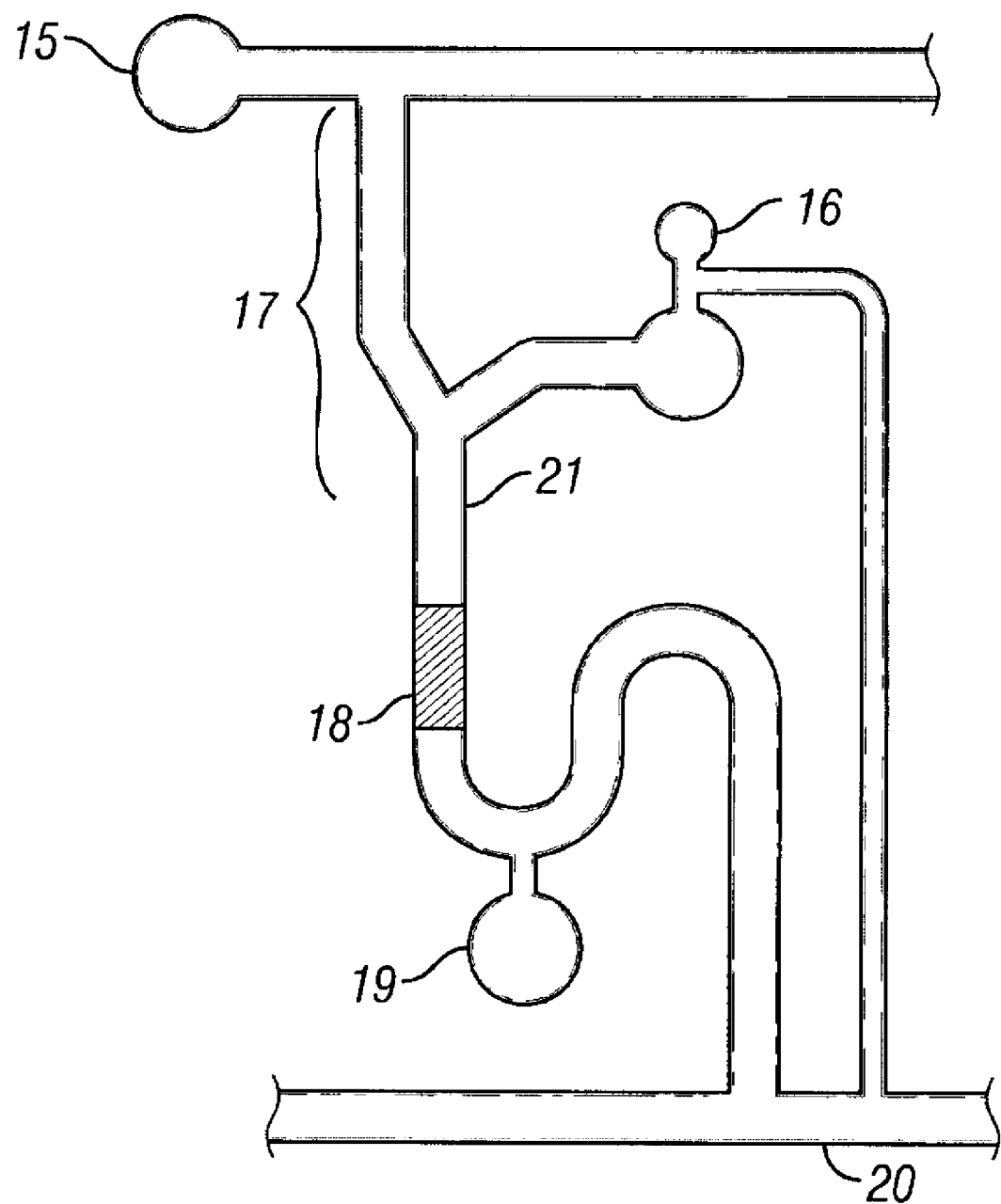

The result for the highest protein concentration is given in FIG. 2. Polystyrene ratio refers to the ratio between the amounts of protein adsorbed for a particular surface and a standard surface (in this case the nude polystyrene surface). The ITO surfaces with adsorbed PEG-PEI had the lowest protein adsorption. See FIG. 2.

Binding of Silan-Acrylate Monomer to the ITO Surface

The ITO obtained as described above (partial O pressure of 10% and 4 scans) was spin coated with MAPTS, 3-methacryloxypropyltrimethylsilane, and cured in oven.

The ITO obtained as described above (partial O pressure of 10% and 4 scans) was spin coated with MAPTS, 3-methacryloxypropyltrimethylsilane, and cured in oven.

The contact angles of the ITO surface before application of MAPTS was 20°, and after MAPTS as expected 66°. This shows that the OH group at the ITO surface has reacted with the silan reagent successfully. The introduced methacrylate group can be used for further derivatizing the surface, for instance by introducing an additional layer by polymerisation utilizing the polymerizable unsaturated monomers.

In the case the unsaturated monomers gives a hydrophobic monomer hydrophobic surfaces that among others can be used as hydrophobic surface breaks as outlined for the fourth aspect of the invention. Hydrophobic surfaces may be obtained directly by utilizing a silanating reagent in which the acrylate group is replaced with a more hydrophobic group. Proper masking is in both variants necessary to create a well-defined boundary between the hydrophilic and hydrophobic surfaces.

Certain innovative aspects of the invention are defined in more detail in the appending claims. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A microfluidic device comprising one, two, three or more enclosed microchannel structures, each of which comprises a) an inlet arrangement with an inlet opening for liquid,
b) a reaction microcavity ($RM_1$) downstream to the inlet opening, and
c) an upstream section that is located between the inlet opening and the reaction microcavity ($RM_1$) and is defined between two planar substrates made of plastic material, wherein one end of the upstream section is fluidly connected to the inlet and the opposing end of the upstream section is fluidly connected to $RM_1$, wherein an inner wall in said upstream section has a hydrophilic layer with an underlying base layer comprising metal oxide, wherein said base layer is provided on at least one planar substrate.

2. The device of claim 1, wherein the metal oxide is indium tin oxide or titanium oxide.

3. The device of claim 1, wherein the hydrophilic layer is
a) provided by the base layer, and/or
b) a part of a top layer exposing a non-ionic hydrophilic groups on its surface.

4. The device of claim 3, wherein
(i) the hydrophilic surface area is according to (b), and
(ii) there are one or more intermediary layers between said base layer and said top layer.

5. The device of claim 3, wherein each of said layers is attached to another of said layers by non-covalent bonds and/or covalent bonds, non-covalent bonds.

6. The device of claim 3, wherein said top layer, if present, is essentially devoid of non-specific adsorption of protein from an aqueous protein-solution in contact with the surface of the top layer.

7. The device of claim 1, wherein said section comprises a part of the inlet arrangement that in the downstream direction ends in a valve function preventing uncontrolled leakage of liquid dispensed to the inlet unit further downstream into the microchannel structure,
the inner surfaces of said inlet arrangement is wettable, typically to the extent that the liquid front of an aqueous liquid dispensed to the unit is capable of reaching the valve function by capillarity.

8. The device of claim 1, wherein said section comprises a microconduit used for transport of an aqueous liquid and the microconduit is between two functional units.

9. The device of claim 1, wherein said section comprises a reaction microcavity ($RM_2$) which is present upstream reaction microcavity $RM_1$ and/or that reaction microcavity $RM_1$ exposes a hydrophilic surface area with an underlying base layer comprising metal oxide.

10. The device of claim 1, wherein said section comprises a detection unit, which is present upstream reaction microcavity $RM_1$.

11. The device of claim 1, wherein said section comprises a heating unit, possibly combined and/or coinciding with a reaction microcavity.

12. The device of claim 1, wherein said base layer is transparent.

13. The device of claim 1, wherein said base layer is electrically conductive.

* * * * *